United States Patent [19]

Pews et al.

[11] 3,888,869

[45] June 10, 1975

[54] BIS (THIOCYANOMETHYLTHIO) THIADIAZOLES

[75] Inventors: R. Garth Pews; Christian T. Goralski, both of Midland; George A. Burk, Bay City, all of Mich.

[73] Assignee: The Dow Chemical Company, Midland, Mich.

[22] Filed: Aug. 13, 1973

[21] Appl. No.: 387,984

[52] U.S. Cl............................ 260/302 SD; 424/270
[51] Int. Cl....................... C07d 91/60; C07d 91/62
[58] Field of Search................................ 260/302 SD

[56] References Cited
UNITED STATES PATENTS
3,753,999   8/1973   Tempgl et al................. 260/302 SD

OTHER PUBLICATIONS

Wagnor et al., Synthetic Organic Chemistry, N.Y., John Wily & Sons, 1953, pp. 787–788.

*Primary Examiner*—Richard J. Gallagher
*Attorney, Agent, or Firm*—Theodore Post; C. Kenneth Bjork

[57] ABSTRACT

2,5-Bis(thiocyanomethylthio)-1,3,4-thiadiazole and its isomer, 3,5-bis(thiocyanomethylthio)-1,2,4-thiadiazole, are prepared by mixing at room temperature substantially one mole of the disodium or dipotassium salt of either 2,5-dimercapto-1,3,4-thiadiazole or its isomer, 3,5-dimercapto-1,2,4-thiadiazole, in methanol with substantially 2 molar proportions of chloromethylthiocyanate. The compounds have antimicrobial activity.

3 Claims, No Drawings

BIS (THIOCYANOMETHYLTHIO) THIADIAZOLES

BACKGROUND OF THE INVENTION

H. Dolman et al., Rec. Trav. Chim. 88, 417 (1969) have disclosed that arylsulfonyl- and arylsulfinyl-methyl thiocyanates have high fungicidal activity and low phytotoxicity. A. G. M. Willems et al., Rec. Trav. Chim. 90, 97 (1971) have disclosed that certain heterocyclic sulfonyl-, sulfinyl-, and thio-methylthiocyanates have fungicidal and phytotoxic properties. Among these are a 1,3,4-thiadiazole-5-yl thiomethylene thiocyanate having a methylthio- or a methylsulfonyl- group in the 2-position; and two 1,2,4-thiadiazole-5-yl compounds having a thiomethylene thiocyanate group in the 5-position and, respectively, a methyl group and a phenyl group in the 3-position.

SUMMARY OF THE INVENTION

This invention concerns the new compounds [2,5-bis(thiocyanomethylthio)-1,3,4-thiadiazole] and [3,5-bis(thiocyanomethylthio)-1,2,4-thiadiazole]. The former product is a white solid powder, melting at 113°–115°C. when recrystallized from acetone, and the latter is a cream-colored solid melting at 58°–60°C. when purified by column chromatography. The products are soluble in hydrophobic solvents such as methylene chloride, chloroform and other chlorinated solvents.

2,5-Bis(thiocyanomethylthio)-1,3,4-thiadiazole is prepared by mixing at room temperature substantially one molar proportion of the dialkali metal salt, e.g., the disodium or dipotassium salt of 2,5-dimercapto-1,3,4-thiadiazole with substantially 2 molar proportions of chloromethylthiocyanate and advantageously up to a 20 percent excess of the latter in the presence of methanol or ethanol as reaction medium. The reaction is advantageously carried to substantial completion by heating at about 60°C. for an additional several hours. The reaction medium is filtered, concentrated to incipient crystallization on cooling and chilled to precipitate the product as a white solid. The product is purified by crystallization from acetone. The reaction is followed by the formation of by-product sodium or potassium chloride. The isomeric 3,5-bis(thiocyanomethylthio)1,2,4-thiadiazole is similarly prepared by substituting the isomeric 3,5-dimercapto-1,2,4-thiadiazole in place of the first starting material.

DESCRIPTION OF THE PREFERRED EMBODIMENTS

The following examples additionally describe specific embodiments and the best modes contemplated by the inventors of carrying out the invention.

EXAMPLE 1:
[2,5-BIS(THIOCYANOMETHYLTHIO)-1,3,4-THIADIAZOLE]

A 10.0 g. (0.044 mole) quantity of the dipotassium salt of 2,5-dimercapto-1,3,4-thiadiazole in 150 ml. of methanol was mixed at room temperature with 11.5 g. (0.107 mole) of chloromethylthiocyanate. After two hours, the KCl recovered from the reaction medium indicated 60% reaction. The reaction was then heated to 63°C. for an additional 2.5 hours. From the filtered methanol solution, after concentrating and cooling, 4.1 g. white solid product was obtained. Purification by crystallization from acetone gave 2.5 g. white powder, m.p. 113°–115°C.

| Anal. | Calc. | Found |
|---|---|---|
| C | 24.6 | 24.9 |
| H | 1.4 | 1.68 |
| N | 19.1 | 18.3 |

EXAMPLE 2:
[3,5-BIS(THIOCYANOMETHYLTHIO)-1,2,4-THIADIAZOLE]

An 11.3 g. (0.05 mole) quantity of the dipotassium salt of 3,5-dimercapto-1,2,4-thiadiazole in 150 ml. of methanol was mixed with 9.65 g. (0.09 mole) of chloromethylthiocyanate at room temperature, then heated at reflux for 3 hours. From the filtered methanol solution, an oil was obtained which was chromatographed twice on silica gel to give 5.0 g. of the title compound in 8 fractions. The purest fraction (as determined by nuclear magnetic resonance spectroscopy) was a light yellow solid, m.p. 58°–60°C.

| Anal. | Calc. | Found |
|---|---|---|
| C | 24.6 | 23.5 |
| H | 1.4 | 1.5 |
| N | 19.1 | 17.3 |

The products of the invention are useful as antimicrobial agents for the control of bacteria and fungi. This is not to suggest that the compounds of this invention and mixtures thereof with usual additives are equally effective against all such organisms at the same concentration. For such uses the compounds can be employed in an unmodified form or dispersed on a finely divided solid and employed as a dust. Such mixtures can also be dispersed in water with the aid of a surface-active agent and the resulting emulsion employed as a spray. In other procedures, the products can be employed as the active constituents in solvent solutions, oil-in-water or water-in-oil emulsions. The augmented compositions are adapted to be formulated as concentrates and subsequently diluted with additional liquid or solid adjuvant to produce the ultimate treating compositions. Good results are obtained when employing compositions containing antimicrobial concentrations and usually from about 1 to about 500 parts by weight of one or more of the compounds per million parts of such compositions.

Incorporation of the compounds of this invention into materials which are subject to fungal attack inhibits the growth of the fungi and preserves the original value of the materials. The compounds are sufficiently non-volatile and water-insoluble that they will persist on or in such materials for long periods of time. Examples of materials which are adversely effected by fungal growth are latex and alkyd paint films, wood and wooden products. The inventive compounds are sufficiently active against fungi that only small quantities are required to prevent mildew on paint films or wood rot. The compounds are therefore useful for long-term protection against fungal growth in or on materials having a wood basis or a protective or decorative paint film subject to fungal attack.

In representative operations, the product of Example 1 when tested for bactericidal and fungicidal activity using conventional agar dilution tests gives complete growth inhibition against Bacillus subtilis, Trichophyton mentagrophytes, Aspergillus terreus, Candida pelliculosa, Pullularia pullulans, Mycobacterium phlei, Rhizopus nigricans and Ceratocystis ips at a concentration of one part per million; against Staphylococcus aureus, Escherichia coli, Candida albicans, Salmonella typhosa and Trichoderma Sp. Madison P-42 at a concentration of 10 parts per million; and against Aerobacter aerogenes and Pseudomonas Sp. Strain 10 at a concentration of 100 parts per million. The product of Example 2 exhibits similar activity.

What is claimed is:

1. A member of the group consisting of [2,5-bis-(thiocyanomethylthio)-1,3,4-thiadiazole] and [3,5-bis(thiocyanomethylthio)-1,2,4-thiadiazole].

2. The compounds of claim 1 which is [2,5-bis(thiocyanomethylthio)-1,3,4-thiadiazole].

3. The compound of claim 1 which is [3,5-bis(thiocyanomethylthio)-1,2,4-thiadiazole].

* * * * *